Oct. 20, 1931.  C. H. HAPGOOD  1,828,225
SCALE INDICATING MEANS
Filed Dec. 26, 1919  2 Sheets-Sheet 1
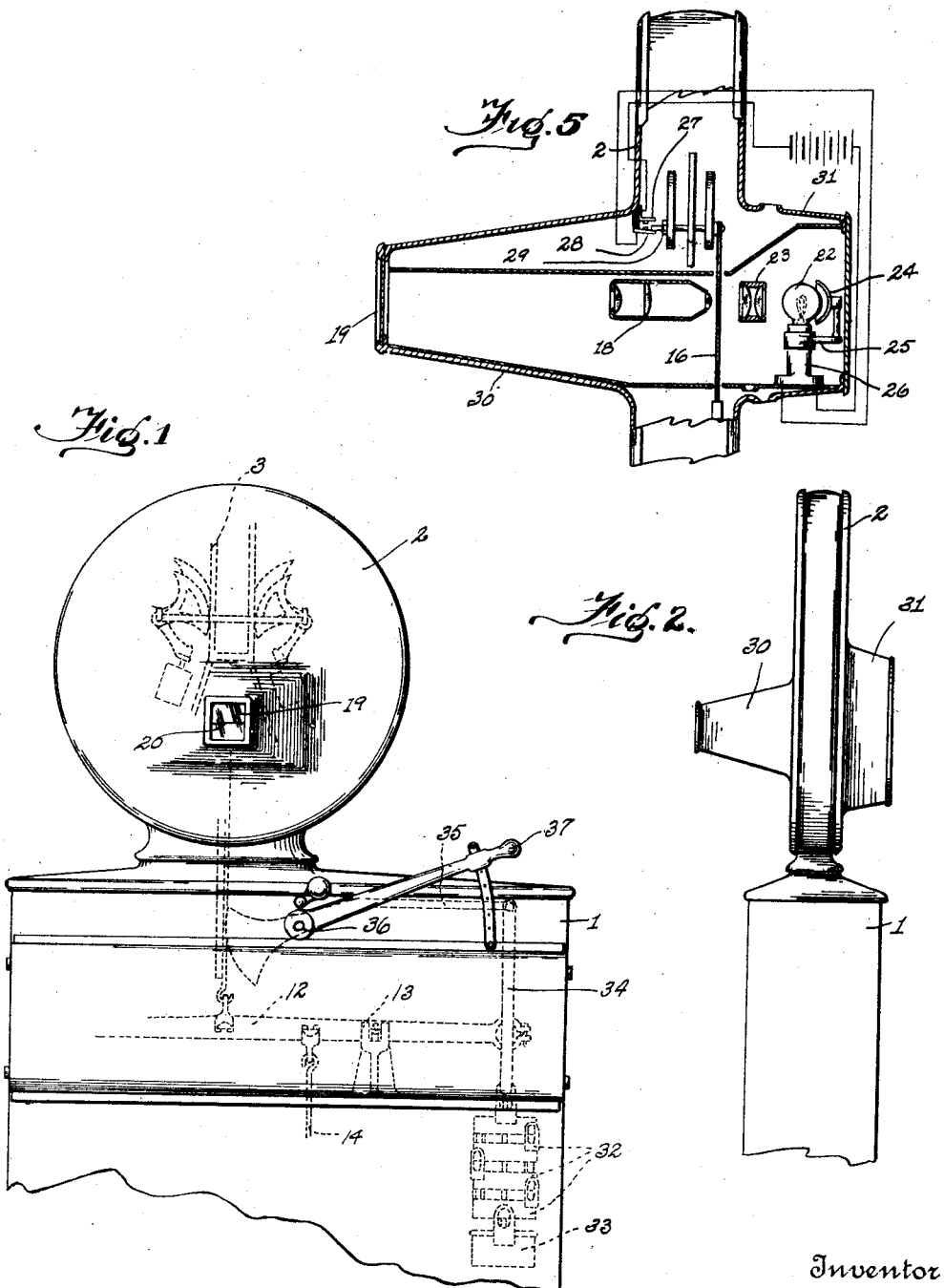
Inventor
Clarence H. Hapgood
By George R. Frye
Attorney Oct. 20, 1931.  C. H. HAPGOOD  1,828,225
SCALE INDICATING MEANS
Filed Dec. 26, 1919  2 Sheets-Sheet 2
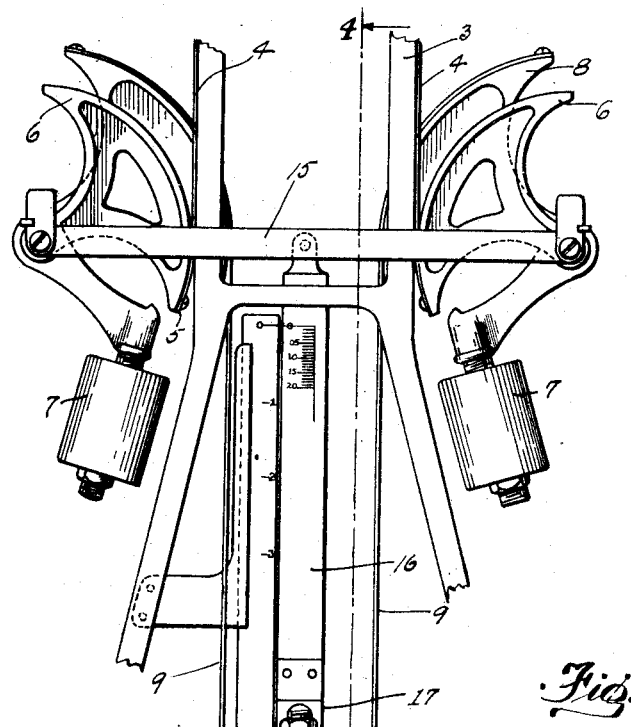
Fig. 3.
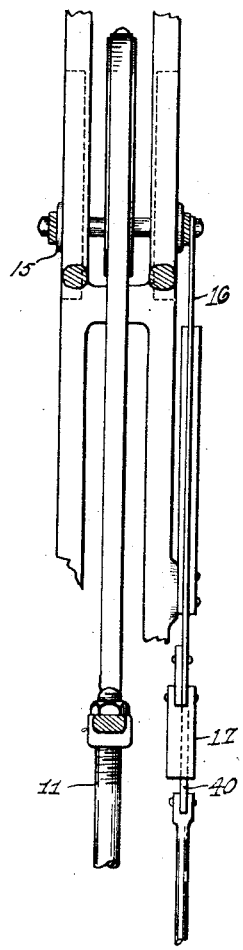
Fig. 4.
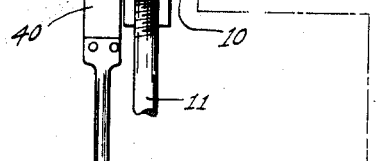
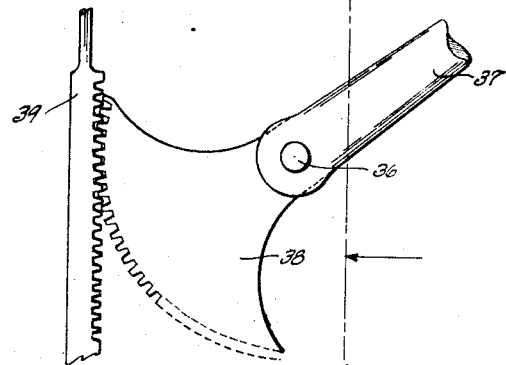
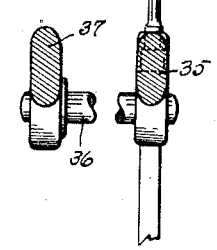
Inventor
Clarence H. Hapgood
By George R. Frye
Attorney Patented Oct. 20, 1931

1,828,225

UNITED STATES PATENT OFFICE

CLARENCE H. HAPGOOD, OF TOLEDO, OHIO, ASSIGNOR TO TOLEDO SCALE COMPANY, OF TOLEDO, OHIO, A CORPORATION OF NEW JERSEY

SCALE INDICATING MEANS

Application filed December 26, 1919. Serial No. 347,399.

This invention relates to weighing scales, and particularly to indicating mechanism therefor. The principal object of the invention is, generally, to provide means for indicating at one place the sum of the weights of two or more portions of a load which are offset by different parts of the load-offsetting mechanism of the scale, and, more specifically, to provide a device for indicating as one number the sum of portions of a load offset respectively by automatic weighing mechanism and manipulative weighing mechanism.

I have in the illustrated embodiment of the invention attained this object by means of movable charts connected respectively to the automatic weighing mechanism and the manipulative weighing mechanism and so related that the weight offset by the automatic mechanism, consisting, for example, of tens and units of pounds, appears as the terminal of a number, the figure in the hundreds place in the same number representing the weight offset by the manipulative weighing mechanism.

Another object of the invention is to provide means for projecting an enlarged image of the number indicating the total weight on a screen so that the image may be read from a considerable distance, even though the figures on the charts be microscopic.

Other objects and advantages will be apparent from the following description, in which reference is had to the accompanying drawings illustrating a preferred embodiment of my invention and in which similar reference numerals designate similar parts throughout the several views.

In the drawings:—

Figure 1 is a front elevation of the upper portion of a scale embodying my invention;

Figure 2 is a side elevation thereof;

Figure 3 is a front elevation of a part of the weighing and indicating mechanism showing the co-operative relation of the charts;

Figure 4 is a section taken substantially on the line 4—4 of Figure 3; and

Figure 5 is a somewhat diagrammatic view through the indicating mechanism.

I have shown my invention as embodied in a scale having automatic pendulum mechanism of the type shown and described in the U. S. Patent No. 1,203,611, issued to me November 7, 1916, and having combined automatic and manipulative mechanism of the type shown and described in the co-pending application of Halvor O. Hem, Ser. No. 96,511, filed May 10, 1916. Since my invention does not reside in these sub-combinations per se, I have illustrated them only in such detail as will serve to clearly show their relation to the other parts of the combination.

As shown in the drawings, the weighing mechanism is enclosed in a housing which consists of a box-like cabinet 1 surmounted by a head 2. Secured inside the head 2 is a frame 3 for supporting the automatic pendulum load-offsetting mechanism and guiding the movements thereof. At the sides of the frame 3 are substantially vertical guide faces against which lie metallic supporting ribbons 4. The upper ends of the ribbons are secured to the frame 3 and their lower ends are secured, as at 5, to the lower ends of the curved faces of fulcrum sectors 6 which form parts of the pendulums 7. Rigid with the fulcrum sectors are power sectors 8, and secured to and overlying the curved faces of the sectors 8 are flexible metallic ribbons 9, the lower ends of which are connected by means of a bar 10 to the upper end of a hook rod 11. The lower end of the hook rod 11 is connected to a lever 12 fulcrumed at 13 within the cabinet 1 and connected by means of a steelyard 14 to the platform lever mechanism (not shown) of the scale.

When a load within the capacity of the pendulum mechanism of the scale is placed upon the platform, the steelyard 14 is pulled downwardly, the lever 12 is rocked on its fulcrum, and the hook rod 11 is pulled downwardly, drawing downwardly on the ribbons 9 and swinging the pendulums 7 outwardly and upwardly until the load is counter-balanced.

Pivotally connected to the pendulums 7 on axes concentric to the curved surfaces of the fulcrum sectors 6 is a frame 15. When the pendulums swing outwardly and the fulcrum sectors 6 roll upwardly on the ribbons 4, the frame 15 is carried vertically upwardly. Pivotally supported midway between the pivotal supports of the frame 15 is a chart 16, consisting of a strip of translucent material having a weight 17 at its lower end. Since the chart is supported midway between the pendulums, one pendulum may swing outwardly and the other inwardly if the scale is slightly out of level without affecting the position of the chart 16.

Mounted in the housing 2 immediately in front of the chart 16 is a projector 18 arranged to throw an image of the indication which is directly back of the projector, upon a ground glass screen 19. The ground glass screen 19 may have a hair-line 20 extending across its face, and the chart and projector are so arranged that the image of the graduation corresponding to the load offset by the pendulum mechanism registers with the hair-line.

In order that the part of the chart which is projected onto the screen may be brilliantly illuminated, I have mounted an electric lamp 22 directly behind the chart 16 and interposed a condenser 23 between the lamp and chart. For the purpose of still further strengthening the illumination, I have mounted a reflector 24 back of the lamp. The reflector is carried upon a stem which is swiveled in a bracket 25 secured to the lamp socket 26.

It is desirable from the standpoint of economy that the illuminating circuit be open except during a weighing operation, and I have therefore provided an automatically operated switch for closing the circuit at the beginning of a weighing operation and opening it when the load is removed from the platform. The switch consists of a stationary contact member 27 suitably supported inside the housing and a resilient contact member 28 normally flexed out of engagement with the stationary member by means of a lug 29 secured upon the center of the frame 15. When the frame 15 moves away as the pendulums swing from zero position, the flexible contact member 28 springs into engagement with the member 27 and closes the circuit lighting the lamp 22, so that the indication is thrown onto the screen 19. In order to secure a larger magnification the forward face of the head 2 is shown as extended forwardly, as at 30, the ground glass screen 19 being mounted in the end of the extension. A rearward extension 31 provides space for the lamp 22, condenser 23 and reflector 24. Suitable doors or apertures may be provided for ready access to the several parts.

The apparatus so far described will automatically indicate any weight within the capacity of the pendulum mechanism. Additional parts of the load are offset by placing unit weights 32 upon a pan 33 suspended from the scale lever 12. The weights 32 are suspended one from the other, the uppermost weight being suspended by means of the link 34 from an arm 35 rigidly fixed to a shaft 36. The shaft 36 is journaled in the front and rear walls of the cabinet 1, and fixed upon an end of the shaft exteriorly of the cabinet is a handle 36. A toothed sector 38, shown in this case as integral with the arm 35, meshes with a rack 39 so that as the shaft 36 is rocked to place the weights upon the pan 33 the rack is moved upwardly.

Secured to the upper end of the rack and positioned beside the chart 16 is a second strip of translucent material 40. The strip 40 is herein shown as graduated to register hundreds of pounds, the graduations being so arranged that when the handle 37 is in elevated position the zero graduation is in position to be projected onto the screen 19, and when the handle is lowered sufficiently to place one weight upon the counterpoise pan 33 the graduation numbered (1) is in position to be projected onto the screen, etc. Since the charts 16 and 40 are side by side, the image on the screen will combine the indications of both charts which are in position to be projected. Since the indication upon the chart 40 is that of hundreds of pounds of weight and the indication on the chart 16 is that of the additional tens and units of pounds, the image on the screen will indicate the total weight of the load.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the class described, in combination, weighing mechanism for offsetting a part of the load, weighing mechanism for offsetting the remainder of the load, indicating mechanism co-operating with both of said weighing mechanisms, said indicating mechanism comprising means for projecting an indication of the sum of the weights offset by said weighing mechanisms upon a screen.

2. In a device of the class described, in combination, weighing mechanism for offsetting a part of the load, weighing mechanism for offsetting the remainder of said load, graduated members connected to said weighing mechanisms, and means for projecting a combined reading from said graduated members upon a screen.

3. In a device of the class described, in combination, manipulative weighing mechanism for offsetting part of the load, automatic weighing mechanism for offsetting the remainder of the load, indicating mechanism co-operating with both of said weighing mechanisms, said indicating mechanism comprising means for protecting an indication of the sum of the weights offset by said weighing mechanisms upon a screen.

4. In a device of the class described, in combination, a pair of pendulums, a graduated member so connected to said pendulums as to be unmoved by like swinging movement of said pendulums and to be moved vertically by opposite swinging movement thereof, and means for projecting readings from said graduated members upon a screen.

5. In a device of the class described, in combination, weighing mechanism for offsetting a part of the load, weighing mechanism for offsetting the remainder of said load, graduated members arranged side by side and connected respectively to said weighing mechanisms, and means for projecting a combined reading from said graduated members.

6. In a device of the class described, weighing mechanism for offsetting a part of the load, weighing mechanism for offsetting the remainder of the load, and graduated members of translucent material arranged side by side and connected respectively to said weighing mechanisms.

7. In a weighing scale, in combination, means for offsetting integers of weight in a load, means for offsetting the fractional remainder of the load, indicating means co-operating with both of said load-offsetting means, said indicating means including means for projecting an indication of the total weight offset by both the load-offsetting means.

8. In a weighing scale, in combination, manipulative weighing mechanism, a rectilinearly movable index connected thereto, automatic weighing mechanism, a rectilinearly movable index connected to said automatic mechanism and located adjacent the first said index, and means for projecting a combined indication from said indexes.

9. In a weighing scale, in combination, manipulative weighing mechanism, a rectilinearly movable index connected thereto, automatic weighing mechanism, and a rectilinearly movable index connected to said automatic mechanism and located adjacent the first said index.

10. In a device of the class described, in combination, weighing mechanism, an index connected thereto, means for projecting an indication from said index upon a screen, and means for automatically illuminating said index when said weighing mechanism moves from zero position.

11. In a device of the class described, in combination, weighing mechanism, an index connected thereto, electric illuminating means for said index, means for projecting an indication from said index upon a screen, a switch electrically connected to said illuminating means, and means operated by movement of said weighing mechanism from zero position for closing said switch.

12. In a device of the class described, in combination, pendulum weighing mechanism, an index connected thereto, electric illuminating means for said index, means for projecting an indication from said index upon a screen, a switch electrically connected to said illuminating means, and means operated by movement of said weighing mechanism from zero position for closing said switch.

13. In a scale, in combination, a pair of oppositely-swinging pendulums, a frame connected to said pendulums to be raised vertically by opposite swinging movements thereof, and a graduated member pivoted to said frame midway between said pendulums.

14. In a scale, in combination, a pair of oppositely-swinging pendulums, a frame connected to said pendulums to be raised vertically by opposite swinging movements thereof, and a depending graduated member pivoted to said frame midway between said pendulums.

15. In a scale, in combination, a pair of oppositely-swinging pendulums having rolling fulcrums, a frame connected to said pendulums to be raised vertically by opposite swinging movements thereof, and a graduated member pivoted to said frame midway between said pendulums.

16. In a weighing scale, in combination, automatic weighing mechanism, a beam having a counterpoise-receiver, a series of unit weights, hand-operated means for placing said weights on said receiver, graduated members connected respectively to said automatic weighing mechanism and said hand-operated means, and means for projecting a combined reading from said graduated members.

17. In a weighing scale, in combination, automatic weighing mechanism, a beam having a counterpoise-receiver, a series of unit weights, hand-operated means for placing said weights on said receiver, rectilinearly-movable graduated members connected respectively to said automatic weighing mechanism and said hand-operated means, and means for projecting a combined reading from said graduated members.

18. In a weighing scale, in combination, automatic weighing mechanism, a beam having a counterpoise-receiver, a series of unit weights, hand-operated means for placing said weights on said receiver, rectilinearly-movable graduated members connected respectively to said automatic weighing mechanism and said hand-operated means and arranged side by side, and means for projecting a combined reading from said graduated members.

19. In a weighing scale, in combination, a pair of oppositely-swinging pendulums, a frame connecting said pendulums, an electric illuminating circuit, a switch in said circuit, and means carried by said frame midway between said pendulums for holding said switch open when said scale is at zero position.

20. In a weighing scale, in combination, a pair of oppositely swinging pendulums having rolling fulcrums, a frame connecting said pendulums, an electric illuminating circuit, a switch in said circuit, and means carried by said frame midway between said pendulums for holding said switch open when said scale is at zero position.

21. The combination in weighing scale mechanism, of a horizontally disposed lever, means for yieldingly resisting the movement of said mechanism in one direction, a connection between said lever and said resisting means, a vertically movable weight indicia bearing member, means connecting said weight indicia bearing member to said resisting means, a screen, and means including a source of light and lenses for projecting the weight indicia onto said screen.

22. The combination in weighing mechanism, of a transparent member means whereby said transparent member may be vertically actuated by movement of said mechanism, said transparent member bearing weight indicia, equalizing means associated with said transparent member for yieldingly resisting movement in one direction, a screen, and means, including a source of light and lenses, for projecting said weight indicia onto said screen.

23. In a device of the class described, in combination, yielding resistance means, a horizontally disposed bar connected at its ends to said yielding resistance means, a transparent member associated with said horizontally disposed bar and movable in a vertical plane, which transparent member bears weight indicia, a screen, and means, including a source of light and lenses, for projecting said weight indicia onto said screen.

24. In a weight indicator for scales, a transparent member bearing weight indicia, which member is adapted to be vertically operated, means for yieldingly resisting the movement of said member in one direction, a screen, and means, including a source of light and lenses, for projecting the weight indicia onto said screen.

25. The combination in weighing mechanism, of a member adapted to be vertically actuated by movement of said mechanism, said member bearing weight indicia, equalizing means associated with said member for yieldingly resisting movement in one direction, a screen, and means, including a source of light and lenses, for projecting said weight indicia onto said screen.

26. In a device of the class described, in combination, yielding resistance means, a horizontally disposed bar connected at its ends to said yielding resistance means, a member associated with said horizontally disposed bar and movable in a vertical plane, which member bears weight indicia, a screen, and means, including a source of light and lenses, for projecting said weight indicia onto said screen.

27. In a weight indicator for scales, a member bearing weight indicia, which member is adapted to be vertically operated, means for yieldingly resisting the movement of said member in one direction, a screen, and means, including a source of light and lenses, for projecting the weight indicia onto said screen.

28. In a weighing scale, in combination, automatic load-counterbalancing mechanism, manually-operated load-counterbalancing mechanism, charts connected respectively to said automatic and manually-operated load-counterbalancing mechanisms, and means whereby a magnified reading may be made of the combined weight indicated on both charts.

29. In a weighing scale of the automatically counterbalanced type having a displaceable indicator and an optical device for projecting the weight indications from said indicator upon a screen, a capacity weight applying means and a supplemental movable indicator for said weights disposed adjacent the first mentioned indicator and in position to have its capacity weight indicators projected upon the screen adjacent the other weight indications by said optical device.

30. In a weighing scale of the automatically counterbalanced type including a scale beam, a movable indicator and automatic load counterbalancing mechanism connected to the beam and said indicator and controlling the differential position of the latter, a capacity weight applying device with provisions for applying one or more capacity weights to said beam, an indicator controlled by said capacity weight applying means, and an optical device having provisions for projecting an indication of weight from one or both of said indicators upon a screen.

31. A weighing scale having in combination a plurality of adjacently disposed transparent chart elements, means for independently displacing each of said elements in accordance with weight factors, and a common optical device having provisions for projecting a combined image from both of said chart elements upon a screen.

32. A weighing scale including a plurality of adjacently disposed movable chart elements, load counterbalancing means for controlling the position of one of said elements, and capacity weight means for controlling the position of the other of said elements, a screen, and optical means for projecting a combined image from both of said charts upon said screen.

CLARENCE H. HAPGOOD.